United States Patent [19]
Jaquet

[11] 3,971,983
[45] *July 27, 1976

[54] FERROMAGNETIC METAL DETECTOR UTILIZING GRADIOMETERS POSITIONED ON OPPOSITE SIDES OF THE DETECTION AREA WITH OVERLAPPING SENSITIVITY

[75] Inventor: James R. Jaquet, Wilmington, Del.

[73] Assignee: Infinetics, Inc., Wilmington, Del.

[ * ] Notice: The portion of the term of this patent subsequent to July 27, 1992, has been disclaimed.

[22] Filed: June 6, 1972

[21] Appl. No.: 260,152

[52] U.S. Cl. .............................. 324/41; 324/43 G; 340/258 C; 340/280
[51] Int. Cl.² ...................................... G01R 33/00
[58] Field of Search .................... 324/41, 43 R, 47; 340/258 R, 258 A, 258 B, 258 C, 258 D, 280, 382

[56] References Cited
UNITED STATES PATENTS

| | | | |
|---|---|---|---|
| 2,179,240 | 11/1939 | Breitenstein | 340/258 C |
| 2,966,853 | 1/1961 | Gillfillan, Jr. | 324/43 |
| 3,292,080 | 12/1966 | Trikilis | 324/41 |
| 3,423,674 | 1/1969 | Goldsmith et al. | 340/258 C |
| 3,487,459 | 12/1969 | Schonstedt | 324/43 |
| 3,758,849 | 9/1973 | Susman et al. | 324/41 |

OTHER PUBLICATIONS

Product Engineering; Doorway Detector Aids Airport Weapons Search; Dec. 1970; p. 43.

Wahl, P., How Science Will Foil The Skyjacker; Pop. Scien., Nov. 1970; pp. 59, 60 and 123.

Primary Examiner—Robert J. Corcoran
Attorney, Agent, or Firm—Seidel, Gonda & Goldhammer

[57] ABSTRACT

A passive ferromagnetic detection station in which the position of the ferromagnetic object carried by a person may be indicated. A plurality of gradiometers mounted at predetermined vertical positions along two vertical members are used to sense any disturbances in the earth's magnetic field. Each gradiometer has a predetermined pattern or area of sensitivity to magnetic fields in which it senses disturbances in the earth's magnetic field. In a preferred embodiment the sensitivity patterns may overlap in predetermined areas. The outputs of the gradiometers are individually processed and converted to digital signals. The digital signals may be used to control a visual display device. In a preferred embodiment, the digital signals may be further processed through digital logic circuitry in order to reduce any false alarms by conditioning any output signal to the display device on the condition that all or a predetermined number of the gradiometers having an overlapping pattern in a particular area sense the ferromagnetic object.

20 Claims, 17 Drawing Figures

FIG. 14
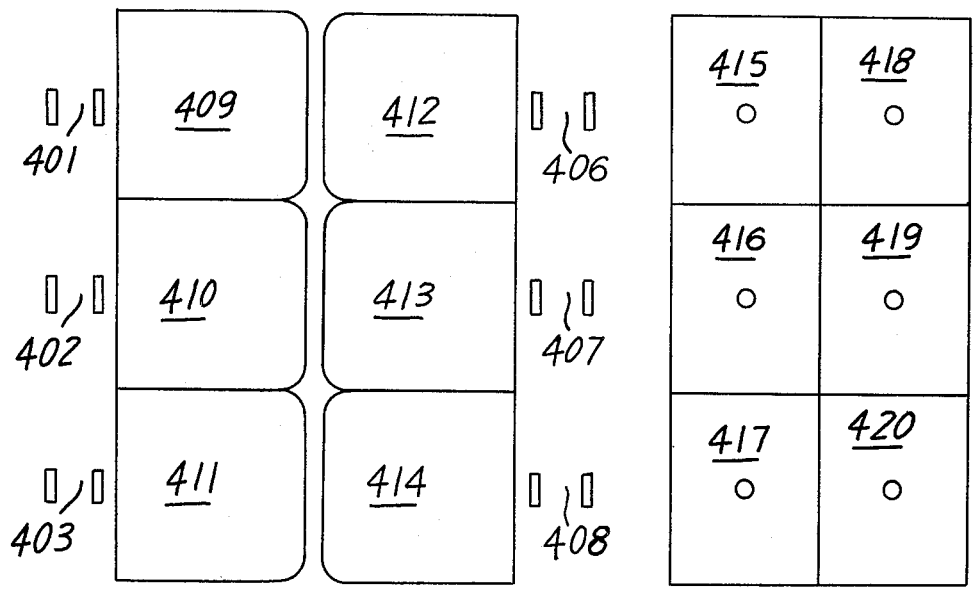
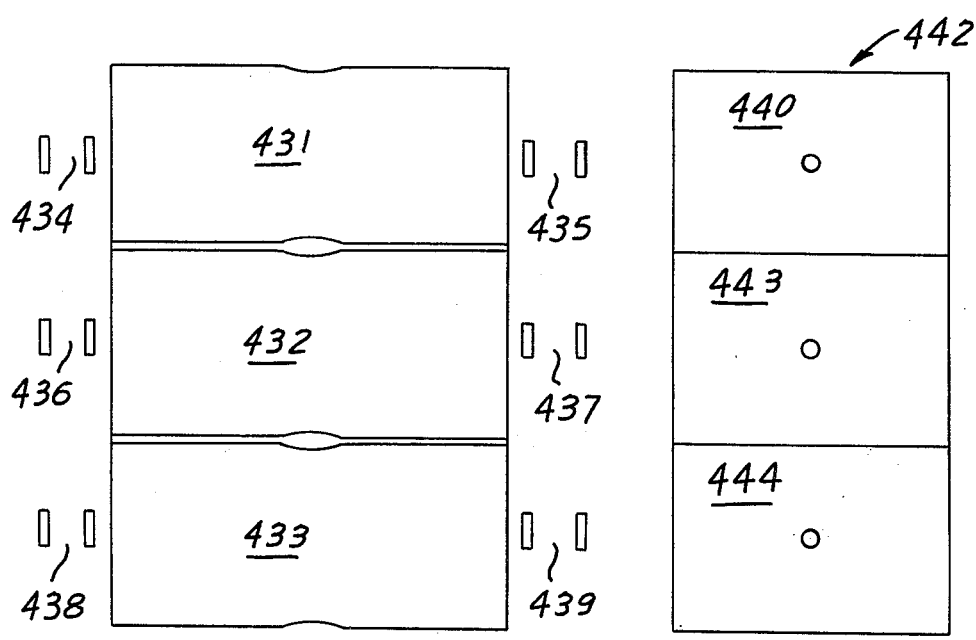
FIG. 15

FERROMAGNETIC METAL DETECTOR UTILIZING GRADIOMETERS POSITIONED ON OPPOSITE SIDES OF THE DETECTION AREA WITH OVERLAPPING SENSITIVITY

DISCLOSURE

This invention relates to a passive ferromagnetic detection station. More particularly, this invention relates to a passive ferromagnetic detection station in which the location or position of a ferromagnetic object carried through the station may be indicated or displayed.

At present, a serious problem exists with the relatively widespread illegal carrying of weapons by members of the public. Serious problems exist with persons illegally carrying concealed weapons such as hand guns, knives, or other ferromagnetic weapons onto airplanes with the intent to hi-jack the airplane. Similar problems exist with persons illegally attempting to carry such ferromagnetic weapons into courtrooms with the intent to disrupt the judicial proceedings. The present invention provides a means to detect the presence of such ferromagnetic weapons or any other ferromagnetic object carried by a person and to indicate the approximate location on the person of such ferromagnetic object.

It is highly advantageous to have a system or apparatus which will indicate not only the presence of a ferromagnetic object, but also its general location. The indication of the location of the ferromagnetic object is highly advantageous since it saves time in locating the ferromagnetic object and, probably more importantly, reduces embarrassment to a person carrying a ferromagnetic object which is not an illegally carried ferromagnetic weapon or other object since the present invention indicates the location of the ferromagnetic object and thereby reduces the field of search or frisking. The ability to passively detect ferromagnetic objects and to obtain an indication of their general location is very important, especially since unreasonable searches are not condoned by law. A search, by definition, is unreasonable when there is no probable cause to believe that a person is illegally carrying a ferromagnetic weapon. Therefore, the present invention provides an indication of the location of the ferromagnetic object on the person, and, therefore, provides the probable cause without invading the person in any way, such as by artificially generated electric or magnetic fields.

The present invention does not generate an electromagnetic field in which the person being monitored is required to walk. The present invention monitors the earth's magnetic field and detects any disturbances in the earth's magnetic field caused by the presence of a ferromagnetic object.

The present invention has uses and advantages in numerous areas. For example, in addition to the detection of illegally carried ferromagnetic weapons onto airplanes or into courtrooms, the apparatus of the present invention may be used to check or screen persons for ferromagnetic objects entering retail, commercial, industrial and government establishments. In addition to being used as a ferromagnetic weapon detector, the apparatus of the present invention may also be used to detect theft of ferromagnetic objects, such as tools and parts which are sometimes taken by persons, either intentionally or through inadvertence, when leaving an industrial plant at the end of the working day. The present invention may also be used to detect ferromagnetic objects moved through the station on a conveyor belt or by other similar means.

As mentioned above, the apparatus of the present invention does not generate an active magnetic field. Therefore, the power consumption by the apparatus of the present invention is minimal. The apparatus of the present invention does not require bulky and heavy components which are usually required to generate a significant electromagnetic field. Such bulky and heavy components increase the cost of manufacture, transportation and installation. In addition, the apparatus of the present invention does not generate a magnetic field and therefore does not interfere with magnetically sensitive objects carried by the person being monitored, such as wristwatches, heart pacemakers and components of radio receivers and recorders.

In the past, a general magnetic detection walk-through station has been known. However, most of the prior art magnetic detection walk-through stations required the generation of an active magnetic field. Some of these devices operated on the theory that a magnetic field produced by a coil would be affected by a ferromagnetic object passing through the field thereby creating counter-effects on the coil which change the characteristics of the coil, such as its inductance. These changes in the characteristics of the coil were then detected as an indication of the presence of a metallic object. Other devices used a pair of coils, one of the coils created a magnetic field which induces a voltage into the second coil. The passage of a metallic object between the two coils caused a disturbance in the voltage induced into the second coil. This change in the induced voltage in the second coil was detected as an indication that a metallic object had passed through the area between the coils.

The present invention provides numerous advantages over the prior art. The present invention provides a passive zonal detection system and apparatus by dividing the total area into zones or predetermined areas so that a number of small ferromagnetic objects carried by a person do not become cumulative to give a false alarm. That is, if a person is carrying a number of small ferromagnetic objects, each of which is insufficient to trigger an alarm, a false alarm will not be given by the cumulative effect of the plurality of objects. However, if more than one sufficiently large ferromagnetic object is carried by the person in different locations, an indication will be given of the position of each of the ferromagnetic objects.

Further advantages of the present invention include the fact that the passive detection system of the present invention inherently discriminates between ferromagnetic materials such as are used in guns and knives and other metals such as silver and copper which are used in coins. In addition, since the present invention is a passive detection system in which no active electromagnetic fields are generated, the apparatus of the present invention does not interfere with sensitive electronic circuitry contained in heart pacemakers worn by a number of persons today. An active electromagnetic field may induce voltages into the electronic circuitry of the heart pacemaker of a person which may seriously affect the operation of the heart pacemaker and therefore the person's heart. This serious problem and numerous other problems may be avoided by the use of a passive detection system in accordance with the present invention.

A further advantage of the present invention is its ease of operation. Therefore, a minimal amount of training is required to enable a person to use the passive detection station of the present invention.

Briefly, in accordance with the present invention, apparatus is provided for detecting the presence of a ferromagnetic object carried by a person and indicating the location of the ferromagnetic object on the person or in his possession, such as in a shoulder holster or briefcase. The apparatus utilizes a station through which the person walks. The station has a first and a second member with a plurality of gradiometers mounted thereon. Each of the plurality of gradiometers has a predetermined pattern or area of sensitivity to magnetic field in the plane between the first and second members, which pattern is substantially less than the total area between the members. Each of the gradiometers generates an output signal indicative of a change in the earth's magnetic field in response to the presence of a ferromagnetic object within the sensitivity pattern of the gradiometer. The output of the gradiometer is processed by processing means which produces a signal responsive only to changes in the earth's magnetic field. The absolute value of this signal is converted into a digital signal. The digital signal may have one value if the disturbance in the earth's magnetic field exceeds a predetermined value and a second value if there is no magnetic field disturbance or the disturbance is below a predetermined value. The output of the processing means is fed to an indicating means which may be used to indicate the position of the ferromagnetic object in response to only certain of the gradiometers detecting the ferromagnetic object.

In other embodiments, the probability of a false indication is substantially reduced or eliminated by mounting the gradiometers or adjusting the patterns or areas of sensitivity to magnetic fields so that there is a predetermined amount of overlap between the patterns or areas of the various gradiometers. The outputs of the gradiometers are processed by processing means which eliminate ambient variations in the earth's magnetic field. Corresponding gradiometers on the first and second members, that is gradiometers positioned at predetermined points along the first and second members' length, may be combined by a summing means and a threshold trigger means to produce a digital center signal which is indicative of a ferromagnetic object being located within a predetermined distance of the center between the first and second members. A digital logic circuit means is also provided which conditions the output indication on the condition that all or a predetermined number of gradiometers having a magnetic pattern of sensitivity to magnetic fields in that area sense the ferromagnetic object.

For the purpose of illustrating the invention, there are shown in the drawings forms which are presently preferred; it being understood, however, that this invention is not limited to the precise arrangements and instrumentalities shown.

Figure 12:
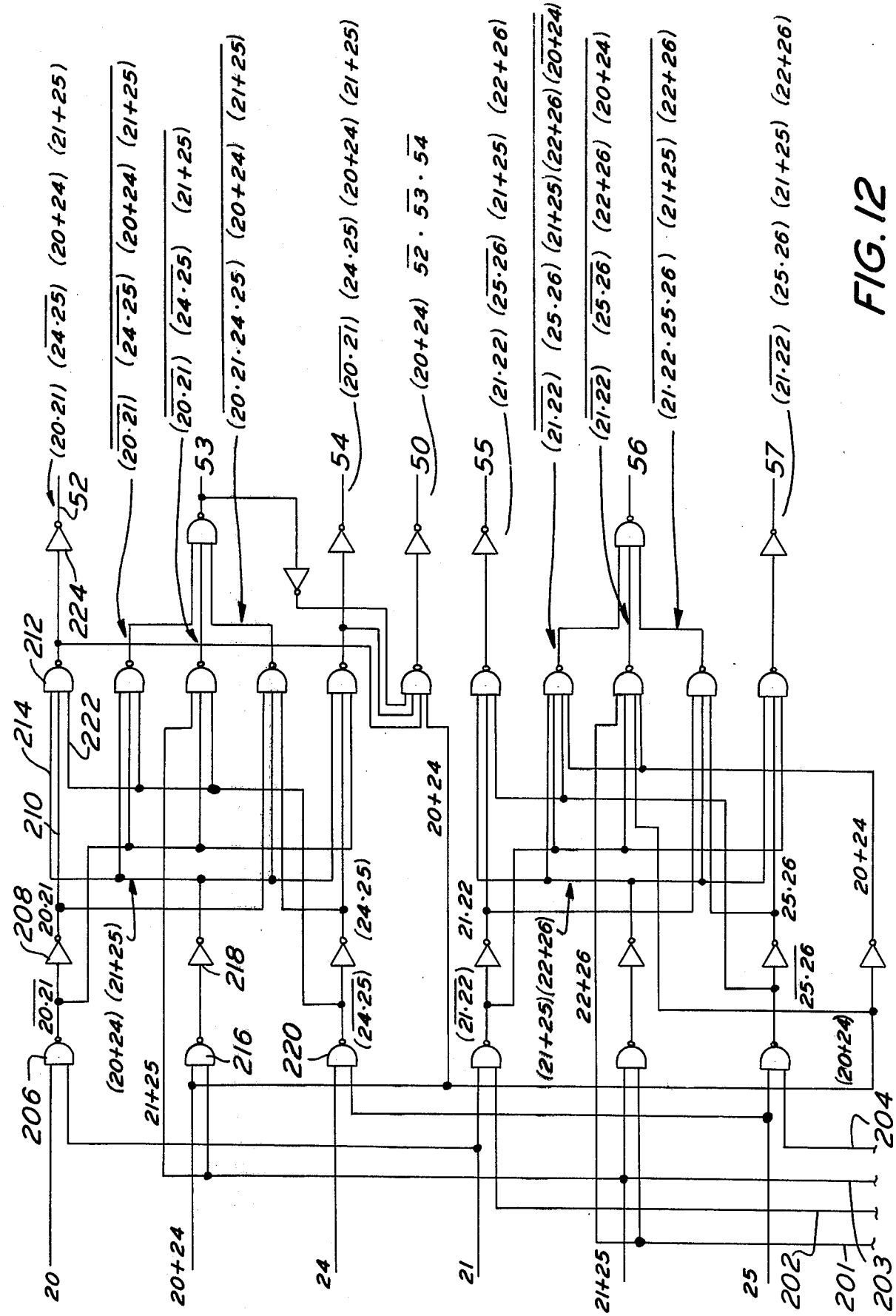
Figure 13:
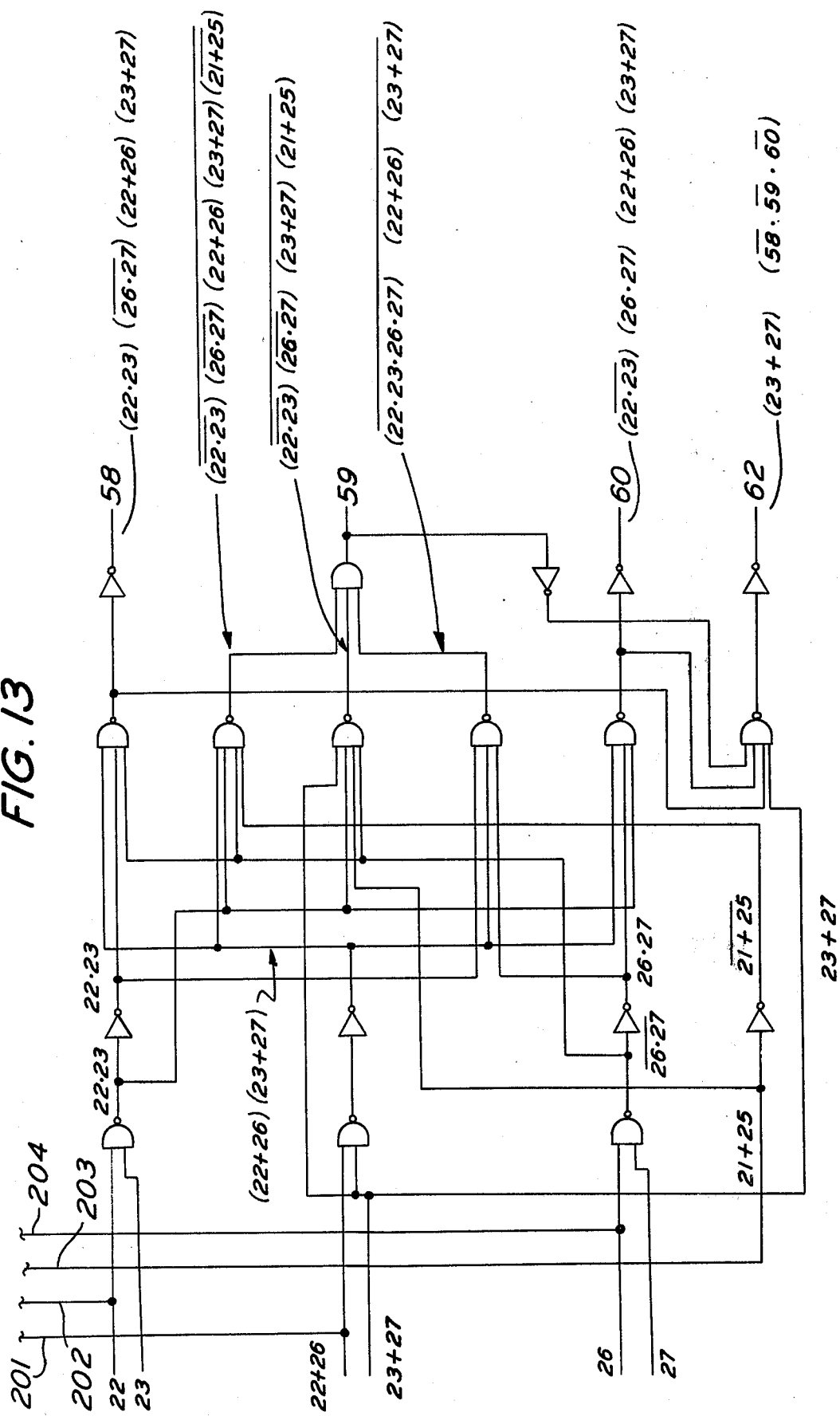

FIGS. 12 and 13 comprise a schematic diagram of digital logic circuitry in accordance with the present invention.

Figure 16:
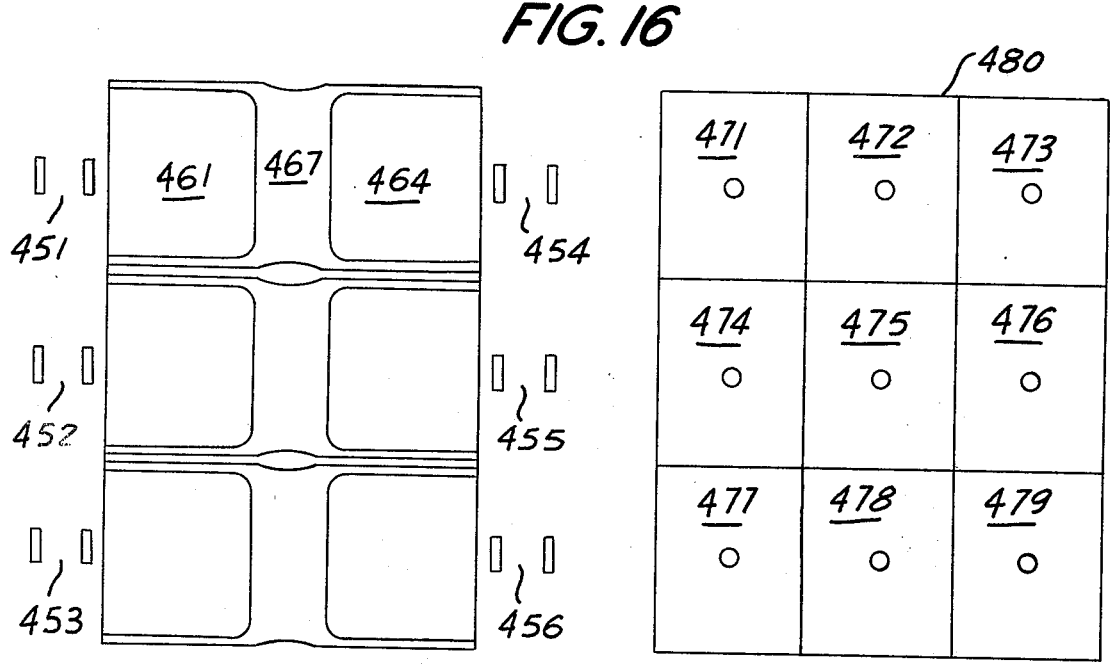

FIGS. 14–16 are diagrams showing arrangements of patterns or areas of sensitivity of magnetic fields of gradiometers in accordance with the present invention.

Figure 17:
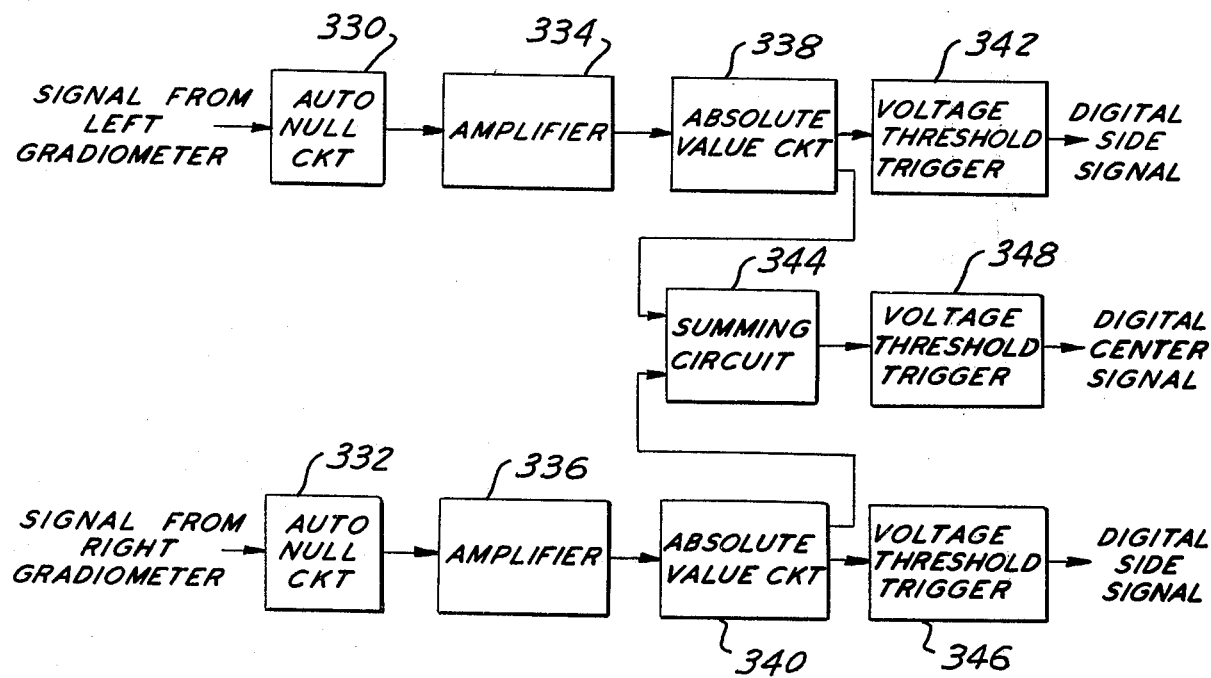

FIG. 17 is a schematic diagram, in block diagram form, of still other signal processing means in accordance with the present invention.

Figure 1:
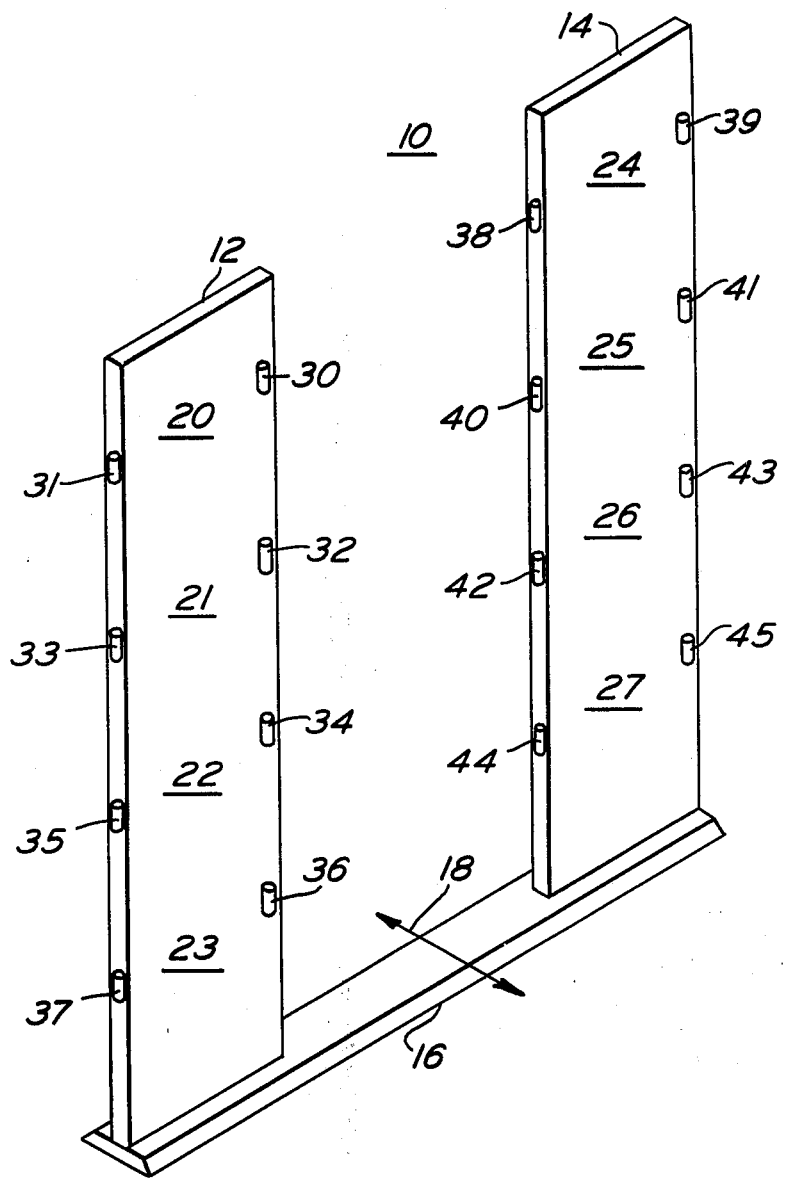
FIG. 1 is a perspective drawing of a magnetometer and gradiometer array of a station in accordance with the present invention.

Referring now to the drawings in detail, wherein like numerals indicate like elements, there is shown in FIG. 1 a station 10. Station 10 may be comprised of a first member or panel 12 and a second member or panel 14. First member 12 and second member 14 may be vertically mounted on base 16. Persons to be monitored by detection station 10 may pass between first member 12 and second member 14 in the directions of double-headed arrow 18.

First member 12 and second member 14 may be of a planar form as shown. However, it is understood that in addition to the planar form or panels, other various shapes may be used to mount gradiometers 20–27. Gradiometers 20–27 are comprised of magnetometers 30–45. Gradiometer 20 is comprised of magnetometers 30 and 31 connected in opposition. That is, the signal outputs of magnetometers 30 and 31 are subtracted from one another. Similarly, gradiometer 21 is comprised of magnetometers 32 and 33 connected in opposition. Gradiometer 24 is comprised of magnetometers 38 and 39 connected in opposition. Similarly, the other gradiometers in FIG. 1 are comprised of the magnetometers as shown.

The gradiometers 20 and 24 are corresponding gradiometers on the first member 12 and the second member 14, respectively. That is, gradiometers 20 and 24 are located at the same predetermined vertical position on first member 12 and second member 14. Although first member 12 and second member 14 may be constructed in any suitable shape, they are shown in the embodiment of FIG. 1 as panels and will be referred to hereinafter as panel 12 and panel 14, as an aid in concreteness of description.

Figure 8:
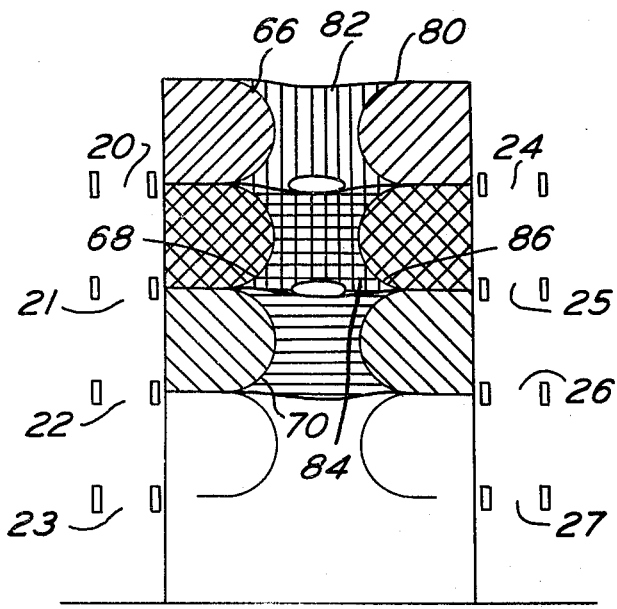
FIG. 8 is a diagram showing one arrangement of overlapping patterns or areas of sensitivity to magnetic fields of the gradiometers in accordance with the present invention.

The patterns or areas of sensitivity to magnetic fields of gradiometers 20, 21, 24 and 25 are shown in FIG. 8. The pattern or area of sensitivity to magnetic fields of gradiometer 20 is shown by curved lines 66 and 68. Curved lines 66 and 68 represent the shape of the pattern or area of sensitivity to magnetic fields. It is understood that the sensing capabilities of gradiometer 20 are not defined definitively by curved lines 66 and 68. The sensitivity or the output signal of each magnetometer 30–45 is proportional to the inverse of the distance raised to the third power between the magnetic phenomena or change to be detected and each respective magnetometer. Although other factors are involved, such as the cosine of the angle of the magnetic dipole with respect to the axis of the magnetometer, generally speaking the sensitivity or the detection capability drops off as the inverse of the distance raised to the third power. Therefore, the output signal of gradiometer 20 in response to a set or fixed magnitude of variation in the magnetic field caused by a ferromagnetic object decreases very rapidly in proportion to the distance of the ferromagnetic object from gradiometer 20.

However, the parameters of the system, such as the threshold level, may be set so that an output signal originating from gradiometer 20 may be had when a ferromagnetic object of the minimum desired size to be detected comes within the reception or sensitivity area defined by lines 66 and 68. The gradiometers herein have a double lobe pattern or area of sensitivity to magnetic fields. Gradiometer 21 has a patterns or areas of sensitivity to magnetic fields defined by curved line 68 and curved line 70. In FIG. 8, the magnetic reception field patterns of gradiometers 20 and 24 are shown in legend block 72. Similarly, the patterns or areas of sensitivity to magnetic fields of gradiometers 21 and 22 are indicated by the shading in legend block 74. It may therefore be seen that the patterns or areas of sensitivity to magnetic fields of gradiometers 20 and 21 overlap in the area defined by curved line 68. Therefore, the presence of a ferromagnetic object within the area defined by curved line 68 would induce a changing signal into gradiometers 20 and 21. Although it is not shown in FIG. 8, for the sake of clarity, a similar double lobed pattern would be exist for gradiometers 22 and 23. Therefore, the pattern or areas of sensitivity to magnetic fields of gradiometers 21 and 22 would overlap within the area defined by curved line 70.

As discussed above, the pattern or area of sensitivity to magnetic fields does not abruptly end with the curved lines 66–70 for gradiometers 20–21, but continues on in a rapidly decreasing field strength pattern. The center area, as shown by the shadings in legend blocks 76 and 78, comprises an area in which a relatively weaker signal would be generated by the corresponding pair of gradiometers 20 and 24 or the corresponding pair of gradiometers 21 and 25. That is, the presence of a ferromagnetic object having a mass in excess of a predetermined minimum, would induce a signal, insufficient by itself to exceed the threshold minimum, in gradiometer 20 and would also induce a signal in gradiometer 24, which would be insufficient by itself to overcome the minimum threshold level. However, by combining the outputs of gradiometers 20 and 24, an indication of the ferromagnetic object would be achieved with the further indication that the ferromagnetic object is within a predetermined range or distance of a center line between gradiometers 20 and 24. The combining of these signals and the signal processing will be discussed in greater detail hereinafter. The area between curved line 80 and curved line 66 represents this center area between gradiometers 20 and 24. This area is shaded in accordance with the shading shown in legend block 76. The area between curved lines 66 and 80 may be designated area 82. Area 84, between curved lines 68 and 86, also represents an overlap of the patterns or areas of sensitivity to magnetic fields of gradiometers 20, 21, 24 and 25. This is indicated in FIG. 8 by the cross-hatched pattern resulting from the shading of block 76 overlapping the shading of block 78.

Figure 2:
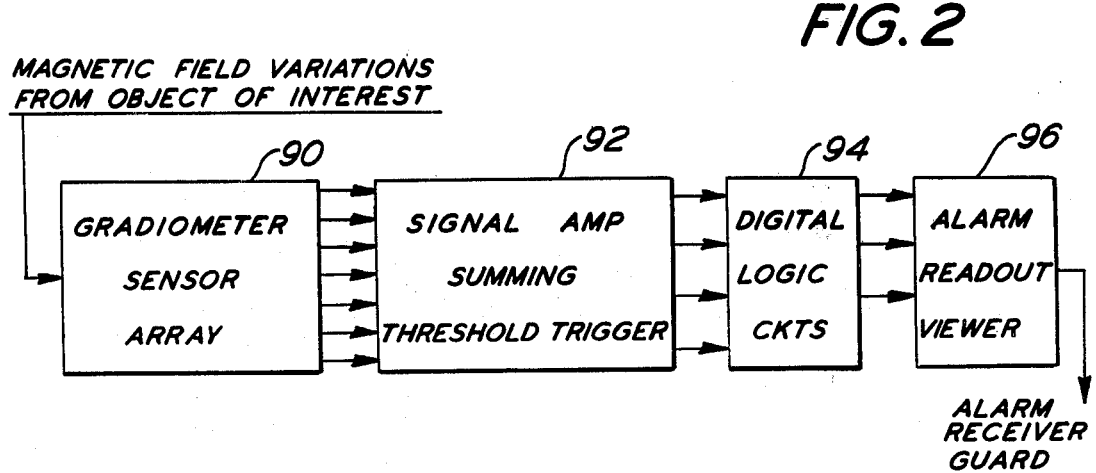
FIG. 2 is a schematic diagram, in block diagram form, of an apparatus in accordance with the present invention.

Referring now to FIG. 2 in conjunction with FIGS. 1 and 8, there is shown a block diagram of an apparatus in accordance with the present invention. Gradiometer array 90 corresponds to the gradiometers shown in FIG. 1. The outputs of the gradiometers in gradiometer array 90 are fed to signal processing means 92. Signal processing means 92 may contain automatic null means in order to null out any relatively long term changes in gradients generated in the earth's magnetic field, signal amplification means, summing means and threshold trigger means for converting the analog signal to a digital signal. The output of signal processing means 92 may be fed directly to an alarm read-out viewer 96 or may be fed through digital logic circuitry 94. Digital logic circuitry 94 may be used where there are overlapping patterns or areas of sensitivity to magnetic fields as shown and described in FIG. 8. If there are no overlapping patterns or areas of sensitivity to magnetic fields, digital logic circuitry 94 would be unnecessary. However, digital logic circuitry 94 does provide a significant advantage in eliminating or reducing the probability of a false indication.

Figure 4:
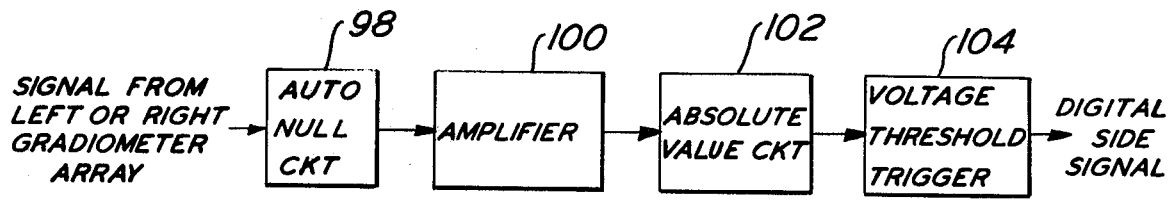
FIG. 4 is a schematic diagram, in block diagram form, of a signal processing means in accordance with the present invention.
Figure 5:
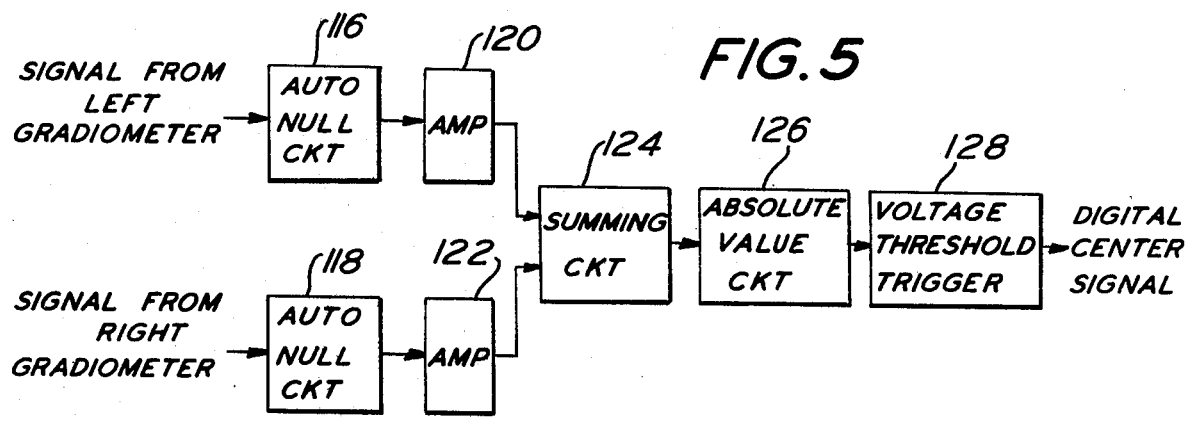
FIG. 5 is a schematic diagram, in block diagram form, of other signal processing means in accordance with the present invention.
Figure 6:
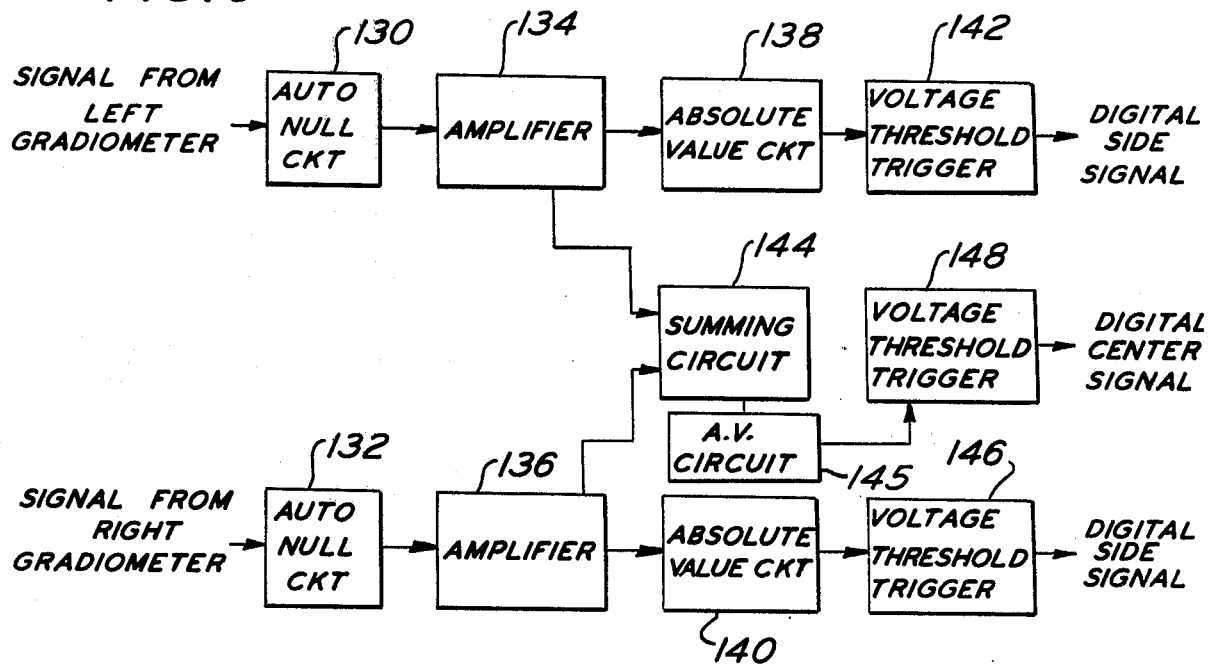
FIG. 6 is a schematic diagram, in block diagram form, of still other signal processing means in accordance with the present invention.

Specific embodiments of the circuitry in the signal processing means 92 are shown in FIGS. 4, 5 and 6. Referring now to FIG. 4, there is shown an automatic null means 98 for removing ambient variations in the earth's magnetic field from the output of the gradiometer. The output of the automatic null circuit 98 is fed to an amplifier 100. The output of amplifier 100 is fed to an absolute value circuit 102. Absolute value circuit 102 produces an output proportional to the magnitude of the input signal, independent of the polarity of the input signal. Various types of absolute value circuits including bridge rectifier circuits are well known and conventional in the art. In addition, the magnetometers and gradiometers and various circuit components such as automatic null circuit 98, amplifier 100 and absolute value circuit may be of the type described in the patent application of Malcolm M. Schwartz and James R. Jaquet, Ser. No. 5,751 which was filed January 26, 1970 and is assigned to the assignee of the present invention. However, it is understood that other types of magnetometers and gradiometers and other types of circuits may be suitable to perform the functions required in accordance with the teachings of the present invention.

The output of absolute value circuit 102 is fed to a voltage threshold trigger circuit 104. Voltage threshold trigger circuit 104 may be a conventional and well known type of threshold circuit. Voltage threshold trigger circuit 104 produces a first predetermined level output in response to the output of absolute value circuit 102 exceeding a predetermined value. Voltage threshold trigger circuit 104 produces a second predetermined level output for all voltage outputs of absolute value circuit 102 which are less than the predetermined value. In other words, voltage threshold trigger circuit 104 converts the analog output of absolute value circuit 102 into a binary digital signal. The output of voltage threshold trigger circuit 104 may be fed directly to alarm read-out viewer 96 which may be a display device as shown in FIG. 3.

A brief example of the operation of the apparatus without the use of digital logic circuits 94 will be illustrated. A circuit as shown in FIG. 4 is used for each of the gradiometers 20-27. If a person passing through detection station 10 had a ferromagnetic gun, knife or other weapon concealed in his shoe which passed through the lower righthand corner of the passageway shown gradiometer FIG. 1, a change in the earth's magnetic field would be detected by gradiometer 27. The output of graiometer 27 would be applied to automatic null circuit 98, assuming that the input to the automatic null circuit 98 in FIG. 4 is connected to the output of gradiometer 27. This change in the magnetic field would be amplified by amplifier 100. The absolute value of the change would be applied to voltage threshold trigger circuit 104 via absolute value circuit 102. A ferromagnetic object the size of a gun or a knife would cause a predetermined level output from voltage threshold trigger circuit 104, which for convenience will be called a high level. The high level output from voltage threshold trigger circuit 104 would be applied to illuminating means or lamp 106 in FIG. 3.

Figure 3:
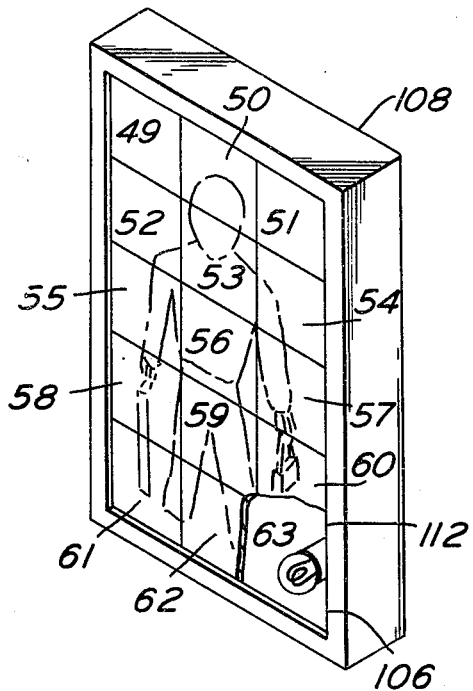
FIG. 3 is a drawing of a display device in accordance with the present invention.
Figure 7:
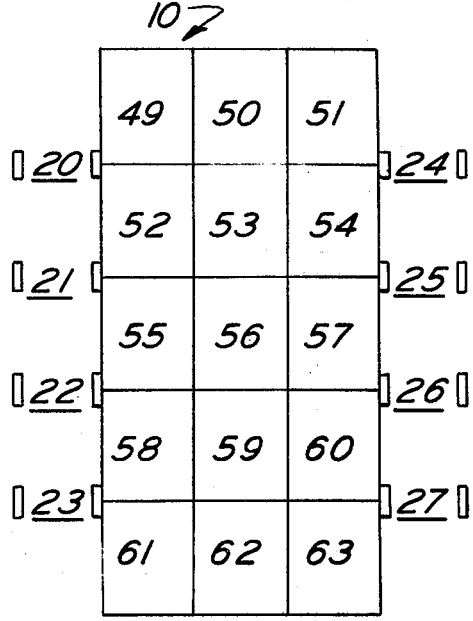
FIG. 7 is a diagram of an arrangement of magnetometers and gradiometers, and of predetermined areas within the detection station useful in illustrating one embodiment of the present invention.

As may be seen in FIG. 3, the display device 108 may be comprised of a translucent sheet 110 with predetermined areas 49-63 indicated thereon. An illuminating means or lamp in contained in each of the areas 49-63. These areas or positions 49-63 correspond to areas or positions of station 10 as shown in FIG. 7. Also affixed to the surface of translucent sheet 110 is the outline of a human being which aids in indicating the location of the approximate position of the detected ferromagnetic object of the person. Although a specific and preferred indicating device has been described and shown in FIG. 3, it is understood that various other types of indicating devices may be used to provide the alarm readout viewer 96. For example, a digital type read-out may be used in which the digital number read-out indicates the position of the ferromagnetic object on the person. Also, similar other types of devices may be used, such as the energizing of different colored lights to indicate a particular position.

Referring now to FIG. 5, there is shown another signal processing means which may be used in the present invention. As described previously with reference to FIG. 8, the pattern or area of sensitivity to magnetic fields is relatively weak in the center of station 10 or walk through station 10. The actual rate of drop off of the pattern or area of sensitivity to magnetic fields with distance may be varied by varying the spacing between the magnetometers comprising a single gradiometer. For example, the magnetic reception or magnetic field sensitivity capabilities of gradiometer 20 would drop off faster with increasing distance if magnetometers 31 and 30 making up gradiometer 20 were mounted closer together. That is, it must be remembered that the outputs of magnetometers 30 and 31 are connected in opposition. Therefore, if magnetometers 30 and 31 are mounted relatively close together, a magnetic field disturbance at a great distance caused by a ferromagnetic object in the earth's magnetic field is sensed approximately to the same degree by both magnetometers. Therefore the output of each magnetometer would be cancelled by the output of the other resulting in no detected change. As a specific example, but not by way of limitation, preferred results have been obtained by mounting the magnetometers comprising each gradiometer twelve inches apart and making the passageway between panels 12 and 14 approximately 36 inches wide.

As a further aid in describing the circuitry and function of FIG. 5, reference should first be had to FIG. 7. FIG. 7 shows the passageway of FIG. 1 divided into predetermined areas which are numbered 49-63. These same numbers are also indicated on the drawing of FIG. 3 since they would correspond to that area indicated on the display device of FIG. 3. Referring now back to FIG. 5, there is shown a block diagram of the circuitry for combining the outputs of the corresponding gradiometers on panels 12 and 14 to provide a digital center signal. For the specific embodiment of the invention shown in FIGS. 1, 7 and 8, there would be four of these circuits. That is, there would be a center channel signal processing circuit for gradiometers 20 and 24, 21 and 25, 22 and 26, and 23 and 27. There are shown in FIG. 5 automatic null circuits 116 and 118, amplifiers 120 and 122 and a summing circuit 124 for summing the outputs of amplifiers 120 and 122. As a specific example, assume that automatic null circuit 116 receives the output of gradiometer 20 and automatic null circuit 118 receives the output of gradiometer 24. Assuming that a ferromagnetic object were present in the earth's magnetic field in predetermined area 50, gradiometer 20 would have an output signal responsive to this disturbance in the magnetic field which would be insufficient to trigger voltage threshold trigger circuit 128 alone. The output of gradiometer 20 would also be insufficient to trigger the voltage threshold trigger circuit 104 in FIG. 4 corresponding to predetermined area 49 and therefore would not energize the lamp in predetermined area 49 in display device 108 of FIG. 3. However, with the output of gradiometer 20 applied to automatic null circuit 116 and the output of gradiometer 24 applied to automatic null circuit 118, the combined inputs to summing circuit 124 after amplification by amplifiers 120 and 122, respectively, would be sufficient to produce an output from voltage threshold trigger circuit after the signal was processed in absolute value circuit 126. Absolute value circuit 126 may be identical to absolute value circuit 102 as described above. Therefore, for the channel corresponding to gradiometers 20 and 24, the output of voltage threshold trigger 128 would illuminate the predetermined area 50 of display device 108. This in effect would indicate that the person has a ferromagnetic knife, gun or other weapon concealed in his hat or otherwise around his head area.

Another embodiment of the circuitry for performing the functions of the circuitry of FIGS. 4 and 5 with some economy of components is shown in FIG. 6. Only four of the circuits shown in FIG. 6 would be required to comprise the total circuitry of signal processing means 92 whereas using the circuitry of FIGS. 4 and 5, would require eight circuits similar to FIG. 4 and four circuits similar to FIG. 5 for an embodiment having the number of gradiometers as shown in FIG. 1. For concreteness in explanation, assume that automatic null circuits 130 and 132 receive their inputs from gradiometers 20 and 24, respectively. The outputs of automatic null circuits 130 and 132 are amplified by amplifiers 134 and 136, respectively. The amplified outputs of amplifiers 134 and 136 are fed to absolute value circuits 138 and 140, respectively, and to summing means 194. Absolute value circuits 138 and 140 may be similar to absolute value circuit 102 as described above. The output of absolute value circuit 138 is applied to voltage threshold trigger circuit 142. Voltage threshold trigger circuit 142 may be similar to voltage threshold trigger circuit 104. The output of absolute value circuit 140 is applied to voltage threshold trigger circuit 146. Voltage threshold trigger circuit 146 may also be similar to voltage threshold trigger circuit 104. The output of summing means 144 is applied to absolute value circuit 145 which may also be similar to absolute value circuit 102. The output of absolute value circuit 145 is applied to voltage threshold trigger circuit 148 which may also be similar to voltage threshold trigger circuit 104. It may be noted in FIG. 6 as in FIG. 5, the summing of the two side signals to produce a center signal in summing means 144 is carried out on the side input signals prior to processing through absolute value circuits 138 and 140. Therefore, the polarity of the outputs of automatic null circuits 130 and 132 may be algebraically combined in summing circuit 144.

In the example here being illustrated, where the inputs to automatic null circuits 130 and 132 are received from gradiometers 20 and 24, respectively, the output of voltage threshold trigger circuit 142 would be applied to the lamp in predetermined area 49 of display device 108. The output of voltage threshold trigger circuit 148 would be applied to the lamp in area 50 of display device 108 and the output of voltage threshold trigger circuit 146 would be applied to the lamp in area 51 of display device 108. That is, depending upon the inputs received by automatic null circuits 130 and 132, one or all of the lamps in areas 49-51 may be energized.

Another embodiment of the circuitry for performing the functions of the circuitry of FIGS. 4 and 5 with an even greater economy of components is shown in FIG. 17. Only four of the circuits shown in FIG. 17 would be required to comprise the total circuitry of signal processing means 92 for an embodiment having eight gradiometers as shown in FIG. 1. The circuit components shown in block diagram in FIG. 17 may be similar to those described in FIG. 6. However, the summing of the side signals for the digital center signal in FIG. 17 is accomplished by summing the outputs of absolute value circuits 338 and 340. Automatic null circuits 330 and 332 receive the outputs from a corresponding pair of gradiometers. That is, for example, automatic null circuit 330 may receive the output of gradiometer 20 and automatic null circuit 332 may receive the output of gradiometer 24. The outputs of automatic null circuits 330 and 332 are amplified by amplifiers 334 and 336 respectively. The output of amplifier 334 is fed to absolute value circuit 338 which supplies an output to voltage threshold trigger 342 and summing means 344. The output of amplifier 336 is fed to absolute value circuit 340 which supplies an output to voltage threshold trigger circuit 346 and to summing means 344. The signals provided to summing means 344 are therefore independent of the polarity output of automatic null circuits 330 and 332. The output of summing means 344 is supplied to voltage threshold trigger 348. Voltage threshold trigger circuits 342 and 346 provide digital side signals which may correspond to predetermined areas 49 and 51 when the inputs to automatic null circuits 330 and 332 are the outputs of gradiometers 20 and 24, respectively. The output of voltage threshold trigger circuit 348 may supply a signal to predetermined area 50.

Before referring to the digital circuitry used in conjunction with the overlapping field patterns of FIG. 8, reference may be had to a few simpler non-overlapping patterns or areas of sensitivity to magnetic fields as shown in FIGS. 14-16. Referring now to FIG. 14, there are shown gradiometers 401-408 having magnetic reception field patterns 409-414, respectively. Each of the gradiometers 401-408 is comprised of a pair of magnetometers as described with respect to FIG. 1. The outputs of each of the gradiometers 401-408 may be fed to a signal processing circuit such as shown in FIG. 4. The outputs of the signal processing circuits for gradiometers 401-408 would be applied to illuminating means in predetermined areas 415-420, respectively. Therefore, an inexpensive passive detection walk through station may be constructed using fewer gradiometers and only the signal processing circuitry shown in FIG. 4 in conjunction with a display device. However, it is understood that more or less gradiometers may be used as desired.

Referring now to FIG. 15, there are shown effective patterns or areas of sensitivity to magnetic fields 431, 432 and 433 generated by the combining of outputs of gradiometers 434 and 435, 436 and 437, and 438 and 439, respectively, in circuitry similar to that of FIG. 5. That is, referring to FIG. 5 in conjunction with FIG. 15, the outputs of gradiometers 434 and 435 would be applied to automatic null circuits 116 and 118, respectively, of FIG. 5 in order to produce the sensitivity pattern 431. The output of voltage threshold trigger circuit 128 would then be applied to the illuminating means in predetermined area 440 of display device 442. Similarly, a disturbance in the earth's magnetic field in the area of sensitivity patterns 432 and 433 would cause the illuminating means in areas 443 and 444, respectively, to be energized.

Another sensitivity pattern arrangement similar to the sensitivity pattern arrangement shown in FIG. 8 without the overlapping sensitivity patterns is illustrated in FIG. 16. There is shown in FIG. 16 gradiometers 451-456. Gradiometer 451 has a sensitivity pattern illustrated as 461. Gradiometer 454 has a field pattern illustrated as 464. The center area 467 may be covered by combining the outputs of gradiometers 451 and 454. Therefore, the total areas of sensitivity patterns 461, 467 and 464 may be covered by applying the outputs of gradiometers 451 and 454 to the inputs of circuits similar to those described in either FIG. 6 or FIG. 17. That is, if the outputs of gradiometers 451 and 454 were applied to automatic null circuits 130 and 132, respectively, of FIG. 6, the outputs of voltage threshold trigger circuits 142, 148 and 146 would be used to energize the lamps in predetermined areas 471, 472 and 473, respectively, of display device 480. Similarly, the outputs of gradiometers 452 and 455 could be processed by a circuit similar to that of FIG. 6 or FIG. 17 to provide signals to the lamps in predetermined areas 474-476 and the outputs of gradiometers 453 and 456 could be processed to provide energizing signals to the lamps in predetermined areas 477-479 of display device 480.

In order to reduce false alarms due to noise in the environment or to occasional noise pulses generated in the electronic circuitry, it is desirable to have a double check or a concurrence of signals before an indication is given. Referring now to FIGS. 7 and 8, as described above, the area 54 which corresponds roughly to the area within curved line 86 of FIG. 8 is an area in which there is an overlap of patterns or areas of sensitivity to magnetic fields of gradiometers 24 and 25. Therefore, if a ferromagnetic object were present within the curved line 86, or in other words approximately within area 54, both gradiometers 24 and 25 should produce an output. Therefore, in order to increase the reliability and accuracy of apparatus in accordance with the present invention, digital logic circuits such as digital logic circuit 94 shown in FIG. 2 may be provided. In other words, in order to energize the lamp in area 54 of display device 108, the output of the voltage threshold triggers corresponding to the channels of gradiometers 24 and 25 would have to produce a signal which would be gated together, as for example in an AND gate, in order to energize the lamp in area 54 of display device 108. Such digital logic circuits are well known in the art and need not be described here in detail. In addition, one skilled in the art may readily provide such gating functions in various desirable configurations. As may be noted from the description of the present invention shown in FIGS. 1, 7 and 8, there is no overlap in areas 49–51 and 61–63. These are relatively inactive areas and it is therefore economical to eliminate the overlap in these areas without a substantial sacrifice of reliability or accuracy. It is apparent that numerous and varied different criteria may be performed by the digital logic circuits 94. That is, various requirements or combinations of gradiometers may be required to produce an output before an indication will be given in a selected area of display device 108.

However, as an example of one set of criteria for digital logic circuits 94, the following logic statements may be used. It is understood that one skilled in the art may reduce the following logic statements to various types of digital logic circuitry. The following logic statements may be implemented by using various types of hardware, such as transistor-transistor logic or resistor-diode logic. In addition, there are numerous ways of implementing logic statements into hardware. Since the methods of implementing logic statements into hardware are conventional and well known, it is felt unnecessary to go through a detailed explanation of various circuits which may be used to implement these logic statements. The logic statements are as follows;

a. 52 shall be OFF unless both 20 and 21 are ON.
b. 55 shall be OFF unless both 21 and 22 are ON.
c. 58 shall be OFF unless both 22 and 23 are ON.
d. 54 shall be OFF unless both 24 and 25 are ON.
e. 57 shall be OFF unless both 25 and 26 are ON.
f. 60 shall be OFF unless both 26 and 27 are ON.
g. 53 shall be OFF unless both 20+24 and 21+25 are ON.
h. 56 shall be OFF unless both 21+25 and 22+26 are ON.
i. 59 shall be OFF unless both 22+26 and 23+27 are ON.
j. With respect to 52, 53 and 54, only one of these shall be ON at any given time.
k. With respect to 55, 56 and 57, only one of these shall be ON at any given time.
l. With respect to 58, 59 and 60, only one of these shall be ON at any given time.
m. If only 20+24 and 21+25 are ON, 53 shall be ON.
n. If only 21+25 and 22+26 are ON, 56 shall be ON.
o. If only 22+26 and 23+27 are ON, 59 shall be ON.
p. If 20, 21, 20+24 and 21+25 are ON, 52 shall be ON.
q. If 24, 25, 20+24 and 21+25 are ON, 54 shall be ON.
r. If 21, 22, 21+25 and 22+26 are ON, 55 shall be ON.
s. If 25, 26, 21+25 and 22+26 are ON, 57 shall be ON.
t. If 22, 23, 22+26 and 23+27 are ON, 58 shall be ON.
u. If 26, 27, 22+26 and 23+27 are ON, 60 shall be ON.
v. If 20, 21, 24, 25, 20+24 and 21+25 are ON, 53 shall be ON.
w. If 21, 22, 25, 26, 21+25 and 22+26 are ON, 56 shall be ON.
x. If 22, 23, 26, 27, 22+26 and 23+27 are ON, 59 shall be ON.
y. If 20+24 is ON and 52, 53 and 54 are OFF, 49, 50 and 51 shall be ON.
z. If 23+27 is ON and 58, 59 and 60 are OFF, 61, 62 and 63 shall be ON.
aa. If 20+24 and 22+26 are ON, 56 shall be ON.
bb. If 21+25 and 23+27 are ON, 59 shall be ON.

Logic statements a through i use the overlapping patterns or areas of sensitivity to magnetic fields as alternate independent paths to verify signals for zones 52–60 inclusive. This reduces any erroneous results which may be caused by highly localized magnetic field fluctuations or electronic circuit noise pulsations. Logic statements j, k and l avoid anomalous signals within a given horizontal group of areas, for example areas 52, 53 and 54. They require a single highest probability location output for any combination of input signals within that horizontal band or group of areas. Logic statements m, n, o, v, w, and x establish two sets of conditions for which the highest probability location is the center areas. Logic statements p, q and r establish the conditions for which the highest probability of location is the left areas and statements s, t and u establish the conditions for the right areas. Since the center zone is defined by or established from the combined effects of two side gradiometers, for example gradiometers 20 and 24, an ON signal from a side gradiometer 20 must also cause an ON signal in the center channel 20–24. However, requiring both signals to be present for a side zone ON further discriminates against possible extraneous noise.

The above set of logic statements and their implementation are not intended to be limiting. The above set of logic statements are given as one example of criteria requiring the sensing of the magnetic field disturbance by a plurality of gradiometers in order to increase the reliability and accuracy of the apparatus.

Although it is felt unnecessary to go through a detailed description and explanation of various means of implementing the above logic statements into hardware, there is shown in FIGS. 12 and 13 a digital logic schematic diagram of one possible implementation. The interconnection between FIGS. 12 and 13 is accomplished by means of wires 201–204. The circuitry of FIGS. 12 and 13 is completely implemented in the form of NAND gates and inverter circuits. A NAND gate is basically an AND gate with an inverted output which is conventional and well known in the art. Similarly inverter circuits are conventional and well known in the art. The inputs to the digital logic circuit shown in FIGS. 12 and 13 are indicated along the lefthand side by the numbers of gradiometers from which the signals originally derive. The outputs of the digital circuitry of FIGS. 12 and 13 are indicated along the right side and indicate the areas of display device 108 which they control. Various functions are indicated on various lines in the digital schematic circuitry of FIGS. 12 and 13. It is believed unnecessary to follow each individual signal through since there are only two types of functions used in this particular embodiment of the digital logic circuitry. Suffice it to note that a dot between two numerals indicates that both signals were present at the input in order to produce a high level on that particular line. A bar or line above the numerals indicates that the signals have been inverted. A plus sign between the numerals indicates a center signal derived from the two gradiometers indicated. Also, a series of parentheses containing groups of symbols indicates that the group of symbols within each set of parentheses is multiplied or "anded together" with the groups of symbols contained in the other sets of parentheses.

Although it is not useful to follow each of the signal paths through the digital logic circuitry of FIGS. 12 and 13, the signal output for output 52 will be followed through. The signals which were originally derived from gradiometers 20 and 21 are applied to the inputs of NAND gate 206. The output of NAND gate 206 is fed through inverter 208 which then becomes 20·21 on line 210 which is an input to NAND gate 212. The input line 214 of NAND gate 212 receives the signal $\overline{(20+24)\,(21+25)}$ from the NAND gate 216 which is inverted by inverter 218. Similarly, NAND gate 220 receives input 24 and input 25 and produces on its output $(\overline{24 \cdot 25})$. This signal is fed to input line 222 of NAND gate 212. NAND gate 212 basically multiplies or ANDS these signals together and inverts it. The signal is then passed through inverter 224 which in effect makes NAND gate 212 and inverter 224 and AND gate. The output on line 52 is therefore (20·21) $(\overline{24 \cdot 25})$ (20+24) (21+25). Although the signal path for each output could be followed through in a similar manner, it is believed to be well within the skill in the art to do so. In addition, the circuit diagram set forth in FIGS. 12 and 13 are not intended to be limiting. It is well known and understood in the art that the logic functions set forth above may be implemented in various other manners.

Figure 9:
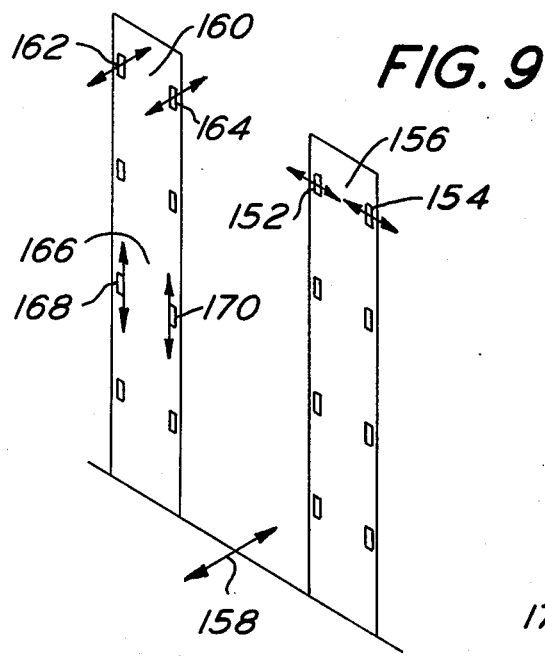
FIGS. 9–11 are drawings showing other arrangements of magnetometers and gradiometers useful in accordance with the principles of the present invention.
Figure 10:
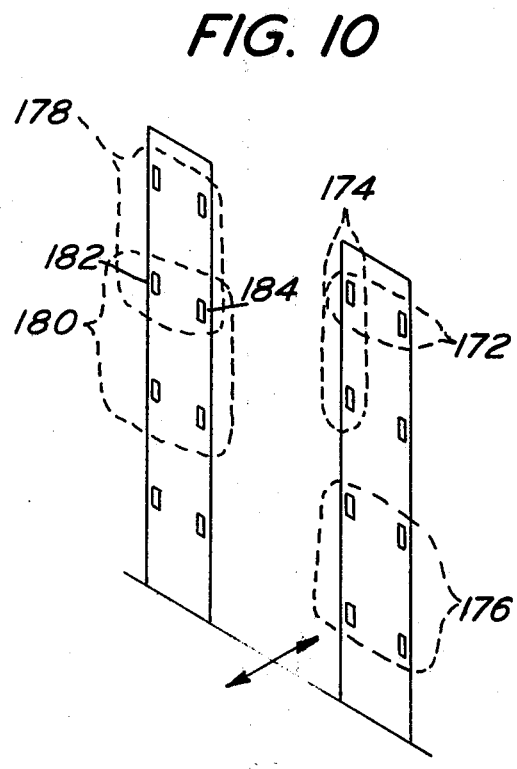
Figure 11:
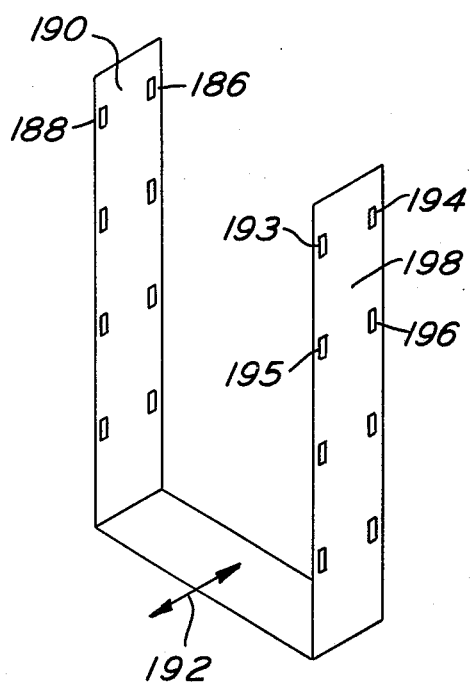

FIGS. 9–11 show various other arrangements of magnetometers and gradiometers which may be utilized in the present invention. In FIG. 9 there are shown magnetometers 152 and 154 which comprise gradiometer 156 which may be a preferred arrangement of gradiometer 24. Magnetometers 152 and 154 have a directive sensitivity pattern which is basically perpendicular to the direction of passage of a person to be monitored which is indicated by double headed arrow 158.

Gradiometer 160 is shown being comprised of magnetometers 162 and 164 having directively sensitively patterns directed generally parallel to the direction of passage indicated by arrow 158. Similarly, gradiometer 166 is comprised of magnetometers 168 and 170 with their directive sensitivity patterns generally parallel and vertical as shown in FIG. 9.

Referring now to FIG. 10, there are shown various magnetometer configurations making up gradiometers which may be used in the present invention. Gradiometer 172 corresponds with the embodiment of gradiometer 24 in FIG. 1. Various other arrangements of gradiometers are shown. Gradiometer 174 indicates a vertical arrangement of magnetometers making up a gradiometer. Gradiometer 176 is comprised of four magnetometers. Similarly, gradiometers 178 and 180 represent other magnetometer arrangements forming gradiometers which may be used in accordance with the present invention. The outputs of the four magnetometers shown in each of the gradiometers 176, 178, and 180 may be summed to produce a four element gradiometer output. Similarly, the outputs of the magnetometers shown in gradiometers 178 and 180 may be algebraically summed. In addition, additional magnetometers may be added to form a single gradiometer with suitable positioning and polarity selection in order to produce a desired pattern or area of sensitivity to magnetic fields and a desired output for a particular application. In addition, if preferred to produce a particular pattern or for economic reasons, the magnetometers common to gradiometers 178 and 180 may be the same units used in both gradiometers. That is, magnetometers 182 and 184 may be shared by both gradiometers 178 and 180.

In addition, the magnetometers making up the gradiometers may be mounted parallel to the direction of passage of the person to be monitored as indicated in FIG. 11. Magnetometers 186 and 188 may be connected to form a gradiometer in which the magnetometers are mounted parallel to the direction of passage indicated by double headed arrow 192. Similarly, a four element gradiometer 198 may be formed from the connection of magnetometers 193–196 shown in FIG. 11.

It will be apparent to those skilled in the art that many variations, modifications and substitutions may be made within the spirit and scope of the teachings of the present invention. For example, any of the alternative configurations, orientations and spacial relations as shown in 9–11 and others may be used in practicing the present invention. It is readily apparent that the number and size of the predetermined areas in station 10 may be varied. In other words, many more or fewer gradiometers may be used. In addition, the areas may be divided up into shapes other than those illustrated. Numerous types of processing circuits may be used to accomplish the same result in the same manner. In addition, voltage threshold trigger circuitry may be provided which detects a plurality of levels to indicate various signal strength magnitudes generated by ferromagnetic objects of various sizes. Furthermore, no overlap is required with respect to the patterns or areas of sensitivity to magnetic fields. However, if overlap is desired to provide the additional advantages, the amount of overlap may vary or range in various predetermined amounts. The overlap as illustrated in FIG. 8 may be termed to be 50% overlap. However, it is apparent that the percentage of overlap could vary from zero overlap to having 3 or 4 gradiometer magnetic field sensitivity patterns overlapping the same area. Similarly, it is apparent that various types of logic functions satisfying various criteria may be used in taking advantage of the high reliability and accuracy provided by the overlapping patterns or areas of magnetic field sensitivity of the gradiometers. It is also apparent that the logic statements for each set of criteria desired may be implemented in numerous ways by conventional and well known digital logic circuitry techniques.

In view of the above, the present invention may be embodied in other specific forms without departing from the spirit or essential attributes thereof and, accordingly, reference should be made to the appended claims, rather than to the foregoing specification as indicating the scope of the invention.

I claim:

1. Apparatus for detecting the presence of a ferromagnetic object passing through a station and indicating the location of said ferromagnetic object, comprising:

a first and a second member at said station, said first and second member having a plurality of gradiometers mounted thereon, each of said plurality of gradiometers having a predetermined pattern or area of sensitivity to magnetic fields which is substantially less than the total area between said first and second members, each of said plurality of gradiometers generating an output signal indicative of a change in the earth's magnetic field in response to the presence of a ferromagnetic object;

means for individually processing output signals generated by each of said plurality of gradiometers, said processing means being comprised of a plurality of processing channel means, each processing channel means receiving the output of at least one respective gradiometer and being operative to generate a digital signal in response to a predetermined change in the earth's magnetic field within the pattern or area of sensitivity to magnetic fields of said at least one respective gradiometer of said plurality of gradiometers; and means for indicating the position of said ferromagnetic object between said first and second members of said station, said indicating means including a plurality of indicators, each of said indicators being responsive to the digital signal generated in a respective one of said processing channel means.

2. Apparatus in accordance with claim 1 wherein each of said plurality of gradiometers has a predetermined pattern or area of sensitivity to magnetic fields in the plane formed by said first and second members and located between said first and second members.

3. Apparatus in accordance with claim 1 wherein said first and second members of said station are positioned vertically.

4. Apparatus in accordance with claim 1 wherein each of said plurality of gradiometers is comprised of a first and a second magnetometer.

5. Apparatus in accordance with claim 4 wherein said first and second magnetometers are connected in opposition.

6. Apparatus in accordance with claim 1 wherein at least one of said processing channel means includes an automatic null means, said automatic null means producing an output responsive only to changes in the output signal generated by a corresponding one of said plurality of gradiometers, an absolute value circuit, said absolute value circuit receiving the output of said automatic null means, said absolute value circuit producing an output proportional to the absolute value of the output of said automatic null means, and a voltage threshold trigger means, said voltage threshold trigger means receiving the output of said absolute value circuit and producing a first predetermined output level only in response to the output of the absolute value circuit exceeding a predetermined value, said voltage threshold trigger producing a second predetermined value if the output of said absolute value circuit does not exceed said predetermined value.

7. Apparatus in accordance with claim 1 wherein at least one of said processing channel means includes a first and a second automatic null means, said first and second automatic null means each producing an output responsive to changes in the output signal generated by one of a corresponding pair of said plurality of gradiometers, summing means, said summing means receiving the outputs of said first and second automatic null means and producing an output proportional to the algebraic sum of the outputs of said first and second automatic null means, an absolute value circuit, said absolute value circuit receiving the output of said summing means, said absolute value circuit producing an output proportional to the absolute value of the output of said summing means, and a voltage threshold trigger means, said voltage threshold trigger means receiving the output of said absolute value circuit and producing a first predetermined output level only in response to the output of the absolute value circuit exceeding a predetermined value, said voltage threshold trigger producing a second predetermined value if the output of said absolute value circuit does not exceed said predetermined value.

8. Apparatus in accordance with claim 1 wherein at least one of said processing channel means includes a first, a second and a third channel, said first and second channels each comprising an automatic null means, said automatic null means producing an output responsive only to changes in the output signal generated by its corresponding one of said plurality of gradiometers, an absolute value circuit, said absolute value circuit receiving the output of said automatic null means, said absolute value circuit producing an output proportional to the absolute value of the output of said automatic null means, and a voltage threshold trigger means, said voltage threshold trigger means receiving the output of said absolute value circuit and producing a first predetermined output level only in response to the output of the absolute value circuit exceeding a predetermined value, said voltage threshold trigger producing a second predetermined value if the output of said absolute value circuit does not exceed said predetermined value, said third channel including a summing circuit, said summing circuit receiving the outputs of said automatic null means in said first and second channels and producing an output proportional to the algebraic sum of the outputs of said automatic null means in said first and second channels, an absolute value circuit, said absolute value circuit receiving the output of said summing means and producing an output proportional to the absolute value of the output of said summing means, and a voltage threshold trigger means, said voltage threshold trigger means receiving the output of said absolute value circuit and producing a first predetermined output level only in response to the output of the absolute value circuit exceeding a predetermined value, said voltage threshold trigger producing a second predetermined value if the output of said absolute value circuit does not exceed said predetermined value.

9. Apparatus in accordance with claim 1 wherein at least one of said processing channel means includes a first, a second and a third channel, said first and second channels each comprising an automatic null means, said automatic null means producing an output responsive only to changes in the output signal generated by a respective one of said plurality of gradiometers, an absolute value circuit, said absolute value circuit receiving the output of said automatic null means, said absolute circuit producing an output proportional to the absolute value of the output of said automatic null means, and a voltage threshold trigger means, said voltage threshold trigger means receiving the output of said absolute value circuit and producing a first predetermined output level only in response to the output of the absolute value circuit exceeding a predetermined value, said voltage threshold trigger producing a second predetermined value if the output of said absolute value circuit does not exceed said predetermined value, said third channel including a summing circuit, said summing circuit receiving the outputs of said absolute value circuits in said first and second channels and producing an output proportional to the absolute value sum of the outputs of said absolute value circuits in said first and second channels, and a voltage threshold trigger means, said voltage threshold trigger means receiving the output of said summing means and producing a first predetermined output level only in response to the output of the summing means exceeding a predetermined value, said voltage threshold trigger producing a second predetermined value if the output of said summing means does not exceed said predetermined value.

10. Apparatus in accordance with claim 1 wherein said indicating means comprises a display device, said display device having a translucent surface, partition means forming a plurality of separated predetermined areas, illuminating means in each of said separate predetermined areas, and means for receiving the output of said processing means for energizing predetermined ones of said illuminating means in response to digital signals generated by said processing means.

11. Apparatus in accordance with claim 10 wherein said translucent surface of said display device is provided with the outline of a human being formed thereon.

12. Apparatus in accordance with claim 1 wherein said digital signal generated by said processing means is a binary signal.

13. Apparatus for detecting the presence of a ferromagnetic object carried by a person and indicating the location of said ferromagnetic object, comprising:
a station having a first and second vertical members, said first and second vertical members having corresponding gradiometers at predetermined points along their lengths, each of said gradiometers having a predetermined pattern or area of sensitivity to magnetic fields, said patterns or areas of sensitivity to magnetic fields of said gradiometers having a predetermined amount of overlap, said overlap occurring in predetermined areas between said first and second vertical members, each gradiometer producing an output signal in response to a change in the earth's magnetic field generated in response to the presence of a ferromagnetic object within the gradiometer's pattern or area of sensitivity to magnetic fields;
first means for processing the output signal of each gradiometer, said processing means generating a digital signal for each gradiometer representative of a change in the earth's magnetic field within the pattern or area of sensitivity to magnetic fields of each gradiometer;
second means for processing output signals of said gradiometers, said second processing means receiving the output signals of the pairs of corresponding gradiometers on said first and second vertical members at a predetermined vertical position on said first and second vertical members, said second processing means forming a digital center signal indicating the presence of a ferromagnetic object within a predetermined distance of the center point between said first and second members;
digital logic means for producing output signals indicative of the position of the ferromagnetic object, said digital logic means receiving said digital signals from said first processing means and said center signals of said second processing means, said digital logic means producing a signal indicating the presence of a ferromagnetic object in a predetermined area only if a predetermined number of gradiometers having a sensitivity pattern in the predetermined area produce a signal indicating the presence of a ferromagnetic object; and
means for indicating the position of said ferromagnetic object between said first and second vertical members, said indicating means being responsive to said outputs of said digital logic means.

14. Apparatus in accordance with claim 13 wherein said first and second vertical members of said station are planar, said first and second planar vertical members being mounted with their planes perpendicular to the direction of travel of a person upon which ferromagnetic objects are to be detected, said gradiometers mounted at predetermined points along the length of said first and second planar members being comprised of a first and second magnetometer, one of said magnetometers of each gradiometer being mounted on said planar member closer to the passageway formed between said planar members and the other magnetometer being mounted a predetermined distance from said first magnetometer in a direction away from said passageway, said first and second magnetometers of each gradiometer being connected in electrical opposition.

15. Apparatus in accordance with claim 13 wherein said first and second vertical members are planar, said first and second planar vertical members being mounted with their planes parallel to the direction of travel of a person who is being detected for the presence of ferromagnetic objects, each of said gradiometers mounted at predetermined points along the length of said first and second planar members being comprised of a first and a second magnetometer, said first and second magnetometers forming each gradiometer being mounted a predetermined distance apart in the plane of said first and second planar members at said predetermined points along the length of said first and second vertical members.

16. Apparatus in accordance with claim 13 wherein said predetermined areas of overlap between said first and second vertical members extends from a height corresponding to the average height of the knee of a person to the average shoulder height of a person.

17. Apparatus in accordance with claim 13 wherein said first processing means includes a plurality of processing channel means, each of said plurality of processing channel means including an automatic null means, said automatic null means producing an output responsive only to changes in the output signal generated by a corresponding one of said gradiometers, an absolute value circuit, said absolute value circuit receiving the output of said automatic null means, said absolute value circuit producing an output proportional to the absolute value of the output of said automatic null means, and a voltage threshold trigger means, said voltage threshold trigger means receiving the output of said absolute value circuit and producing a first predetermined output level only in response to the output of the absolute value circuit exceeding a predetermined value, said voltage threshold trigger producing a second predetermined value if the output of said absolute value circuit does not exceed said predetermined value.

18. Apparatus in accordance with claim 17 wherein said second processing means includes a summing means and a voltage threshold trigger means, said summing means receiving the output of said absolute value circuits corresponding to the output signals of the pairs of corresponding gradiometers on said first and second vertical members at a predetermined vertical position on said first and second vertical members, said voltage threshold circuit receiving the output of said summing circuit, said voltage threshold trigger means producing a first predetermined output level only in response to the output of the summing means exceeding a predetermined value, said voltage threshold trigger producing a second predetermined value if the output of said summing means does not exceed said predetermined value, the output of said voltage threshold trigger means being said digital center signal.

19. Apparatus in accordance with claim 13 wherein said second processing means comprises a first and a second automatic null means, said first and second automatic null means receiving the output signals of the pairs of corresponding gradiometers, respectively, on said first and second vertical members at a predetermined vertical position on said first and second vertical members, a summing means, said summing means receiving the output of said first and second automatic nulling means and producing a summed output, an absolute value circuit, said absolute value circuit receiving the summed output of said summing means and producing an output proportional to the absolute value of the output of said summing means, a voltage threshold trigger means, said voltage threshold trigger means receiving the output of said absolute value circuit and producing a first predetermined output level only in response to the output of the absolute value circuit exceeding a predetermined value, said voltage threshold trigger producing a second predetermined value if the output of said absolute value circuit does not exceed said predetermined value, said output of said voltage threshold trigger means being said digital center signal.

20. Apparatus in accordance with claim 13 wherein said indicating means comprises a display device, said display device having a translucent surface, partition means forming a plurality of predetermined areas, illuminating means in each of said predetermined areas, and means for energizing predetermined ones of said illuminating means in response to digital signals generated by said digital logic means.

* * * * *